United States Patent [19]

Takizawa et al.

[11] Patent Number: 5,381,657

[45] Date of Patent: Jan. 17, 1995

[54] CATALYST DETERIORATION-DETECTING SYSTEM FOR INTERNAL COMBUSTION ENGINES

[75] Inventors: Tsuyoshi Takizawa; Yasunari Seki; Yoichi Iwata; Toshihiko Sato, all of Wako; Takayoshi Nakayama, Tochigi, all of Japan

[73] Assignee: Honda Giken Kogyo Kabushiki Kaisha, Tokyo, Japan

[21] Appl. No.: 183,751

[22] Filed: Jan. 21, 1994

[30] Foreign Application Priority Data

Jan. 22, 1993 [JP] Japan .................................. 5-027292

[51] Int. Cl.⁶ .............................................. F01N 3/20
[52] U.S. Cl. ........................................ 60/276; 60/277; 60/285; 123/674; 123/703
[58] Field of Search ................. 60/273, 274, 276, 277, 60/285; 123/672, 674, 703

[56] References Cited

U.S. PATENT DOCUMENTS

| | | | |
|---|---|---|---|
| 5,154,055 | 10/1992 | Nakane | 60/276 |
| 5,220,788 | 6/1993 | Kurita | 60/274 |
| 5,227,975 | 7/1993 | Nakaniwa | 123/674 |
| 5,280,707 | 1/1994 | Nakashima | 60/276 |

*Primary Examiner*—Ira S. Lazarus
*Assistant Examiner*—Daniel J. O'Connor
*Attorney, Agent, or Firm*—Nikaido, Marmelstein, Murray & Oram

[57] ABSTRACT

A catalyst deterioration-detecting system is provided for an internal combustion engine having an oxygen concentration sensor arranged in an exhaust system downstream of a catalyst provided therein. An electronic control unit (ECU) controls the air-fuel ratio of a mixture supplied to the engine in response to an output from the oxygen concentration sensor. The ECU detects a value of an inversion period with which the output from the oxygen concentration sensor is inverted with respect to a predetermined reference value. Operating parameter sensors detect a value of at least one operating parameter of the engine related to a flow rate of the exhaust gases in the exhaust system. The ECU determines whether the catalyst is deteriorated, based on the detected value of the inversion period and the detected value of the at least one operating parameter. The ECU corrects the value of the inversion period in dependence on the detected value of the at least one operating parameter.

16 Claims, 16 Drawing Sheets

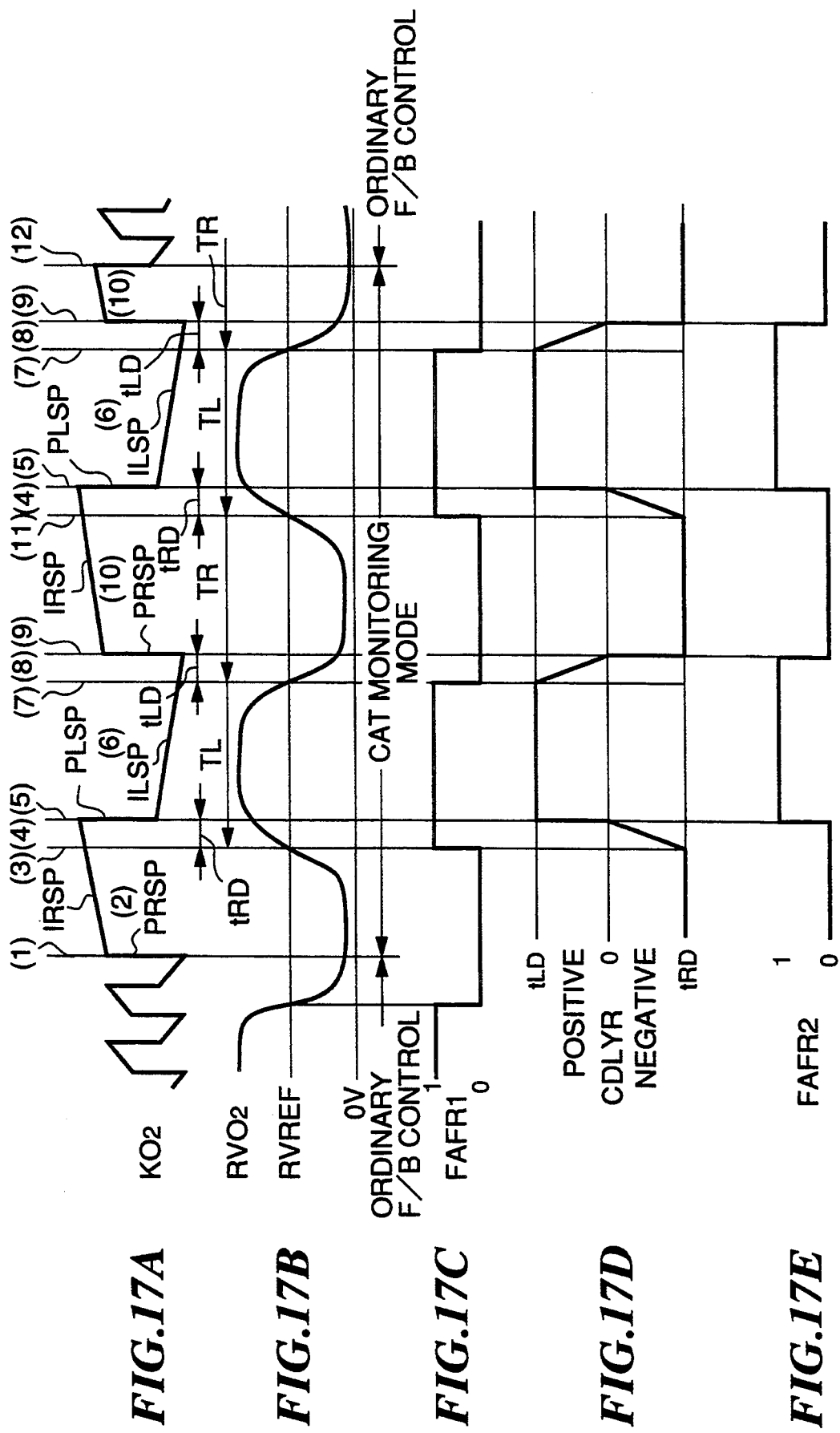

CATALYST DETERIORATION-DETECTING SYSTEM FOR INTERNAL COMBUSTION ENGINES

BACKGROUND OF THE INVENTION

1. Field of the Invention

This invention relates to a catalyst deterioration-detecting system for detecting deterioration of a catalyst arranged in the exhaust system of an internal combustion engine for purifying exhaust gases emitted from the engine, and more particularly to a catalyst deterioration-detecting system which detects deterioration of the catalyst by the use of an output from an oxygen concentration sensor arranged in the exhaust system.

2. Prior Art

Conventional methods for detecting deterioration of catalysts for purifying exhaust gases from internal combustion engines include a method which comprises providing O2 sensors (oxygen concentration sensors) arranged upstream and downstream of a catalyst arranged in the exhaust system of an internal combustion engine, changing the air-fuel ratio of a mixture supplied to the engine in response to outputs from the O2 sensors while a vehicle in which the engine is installed is traveling under a predetermined traveling condition, measuring a time period (inversion period) elapsed from the time the air-fuel ratio is inverted to the time the output from the $O_2$ sensor arranged downstream of the catalyst is inverted, and determining whether the catalyst is deteriorated, from the measured time period (e.g. Japanese Provisional Patent Publications (Kokai) Nos. 2-30915, 2-33408, and 2-207159), a method which comprises comparing between an output from the upstream $O_2$ sensor and an output from the downstream O2 sensor, such as a method of determining the ratio between the two sensor outputs (Japanese Provisional Patent Publication (Kokai) No. 63-231252), a method of determining the response ratio between the sensor outputs (Japanese Provisional Patent Publication (Kokai) No. 3-57862), and a method of determining the phase difference time between the sensor outputs (Japanese Provisional Patent Publication (Kokai) No. 2-310453).

All these prior art methods contemplate the oxygen storage capacity of the catalyst, and determine deterioration of the catalyst by quantifying the oxygen storage capacity.

After a further study in order to improve the above-mentioned prior art methods, the present inventors have reached the finding that the inversion period of the output from the O2 sensor becomes shorter as an amount of exhaust gases flowing in the exhaust system of the engine, i.e. the flow rate of exhaust gases in the exhaust system, is larger.

However, the above-mentioned prior art methods do not contemplate the influence of the exhaust gas flow rate upon the determination of deterioration of the catalyst using the inversion period, and as a result, provide room for a misjudgment as to deterioration of the catalyst.

SUMMARY OF THE INVENTION

It is the object of the invention to provide a catalyst deterioration-detecting system, which is capable of accurately detecting deterioration of a catalyst arranged in the exhaust system of an internal combustion engine, irrespective of the flow rate of exhaust gases in the exhaust system.

To attain the above object, the present invention provides a catalyst deterioration-detecting system for an internal combustion engine having an exhaust system, catalyst means arranged in the exhaust system, oxygen concentration-detecting means arranged in the exhaust system downstream of the catalyst means, for detecting concentration of oxygen in exhaust gases emitted from the engine, and air-fuel ratio control means responsive to an output from the oxygen concentration-detecting means, for controlling an air-fuel ratio of a mixture supplied to the engine, comprising:

catalyst deterioration parameter-detecting means for detecting a value of a catalyst deterioration parameter indicative of a degree of deterioration of the catalyst means;

operating parameter-detecting means for detecting a value of at least one operating parameter of the engine related to a flow rate of the exhaust gases in the exhaust system; and catalyst deterioration-determining means for determining whether the catalyst means is deteriorated, based on the value of the catalyst deterioration parameter detected by the catalyst deterioration parameter-detecting means and the value of the at least one operating parameter detected by the operating parameter-detecting means.

The catalyst deterioration parameter-detecting means may comprise inversion period-detecting means for detecting a value of an inversion period with which the output from the oxygen concentration-detecting means is inverted with respect to a predetermined reference value;

The catalyst deterioration-determining means includes means for correcting the value of the inversion period in dependence on the value of the at least one operating parameter detected by the operating parameter-detecting means.

In a preferred embodiment of the invention, the catalyst deterioration-detecting system comprises:

catalyst deterioration parameter-detecting means for detecting a value of a catalyst deterioration parameter indicative of a degree of deterioration of the catalyst means;

operating parameter-detecting means for detecting a value of at least one operating parameter of the engine related to a flow rate of the exhaust gases in the exhaust system;

determination value-setting means for setting a determination value for comparison with the value of the catalyst deterioration parameter detected by the catalyst deterioration parameter-detecting means, based on the value of the at least one operating parameter detected by the operating parameter-detecting means; and catalyst deterioration-determining means for comparing between the value of the catalyst deterioration parameter detected by the catalyst deterioration parameter-detecting means and the determination value set by the determination value-setting means, and for determining that the catalyst means is deteriorated, when the detected value of the catalyst deterioration parameter shows a value indicative of a larger degree of deterioration of the catalyst means than the determination value.

Preferably, the catalyst deterioration parameter-detecting means comprises inversion period-detecting means for detecting a value of an inversion period with which the output from the oxygen concentration-detecting means is inverted with respect to a predetermined reference value, the determination value-setting means setting the determination value for comparison with the value of the inversion period detected by the inversion period-detecting means, based on the value of the at least one operating parameter detected by the operating parameter-detecting means, the catalyst deterioration-determining means comparing between the value of the inversion period detected by the inversion period-detecting means and the determination value set by the determination value-setting means, and determining that the catalyst means is deteriorated, when the detected value of the inversion period is shorter than the determination value.

In this embodiment, the determination value-setting means sets the determination value to a smaller value as the value of the at least one operating parameter detected by the operating parameter-detecting means shows a value indicative of a larger value of the flow rate of the exhaust gases.

In another embodiment of the invention, the catalyst deterioration-detecting system comprises:

air-fuel ratio-determining means for comparing the output from the oxygen concentration-detecting means with a predetermined reference value to thereby determine whether the air-fuel ratio of the mixture supplied to the engine is on a richer side or a leaner side with respect to a stoichiometric air-fuel ratio;

air-fuel ratio-retarding control means for changing the air-fuel ratio of the mixture supplied to the engine across the stoichiometric air-fuel ratio upon the lapse of a delay time period after the time the inversion is detected by the inversion-detecting means;

catalyst deterioration parameter-detecting means for detecting a value of a catalyst deterioration parameter indicative of a degree of deterioration of the catalyst means;

operating parameter-detecting means for detecting a value of at least one operating parameter of the engine related to a flow rate of the exhaust gases in the exhaust system;

delay time period-determining means for determining a value of the delay time period, based on the value of the at least one operating parameter detected by the operating parameter-detecting means; and catalyst deterioration-determining means for comparing the value of the catalyst deterioration parameter detected by the catalyst deterioration parameter-detecting means with a predetermined value, and for determining that the catalyst means is deteriorated, when the value of the catalyst deterioration parameter detected by the catalyst deterioration parameter-detecting means shows a value indicative of a larger degree of deterioration of the catalyst means than the predetermined value.

According to this embodiment, the delay time period-determining means sets the value of the delay time period to a larger value as the value of the at least one operating parameter detected by the operating parameter-detecting means shows a value indicative of a larger value of the flow rate of the exhaust gases.

In a further embodiment of the invention, the catalyst deterioration-detecting system comprises:

catalyst deterioration parameter-detecting means for detecting a value of a catalyst deterioration parameter indicative of a degree of deterioration of the catalyst means;

operating parameter-detecting means for detecting a value of at least one operating parameter of the engine related to a flow rate of the exhaust gases in the exhaust system;

catalyst deterioration parameter-correcting means for correcting the value of the catalyst deterioration parameter detected by the catalyst deterioration parameter-detecting means, based on the value of the at least one operating parameter of the engine detected by the operating parameter-detecting means; and catalyst deterioration-determining means for comparing the value of the catalyst deterioration parameter corrected by the catalyst deterioration parameter-correcting means with a predetermined value, and for determining that the catalyst means is deteriorated, when the corrected value of the catalyst deterioration parameter shows a value indicative of a larger degree of deterioration of the catalyst means than the predetermined value.

Preferably, the catalyst deterioration parameter-detecting means comprises inversion period-detecting means for detecting a value of an inversion period with which the output from the oxygen concentration-detecting means is inverted with respect to a predetermined reference value, the catalyst deterioration parameter-correcting means correcting the value of the inversion period detected by the inversion period-detecting means, based on the value of the at least one operating parameter detected by the operating parameter-detecting means, the catalyst deterioration-determining means comparing between the value of the inversion period detected by the inversion period-detecting means and the predetermined value, and determining that the catalyst means is deteriorated, when the detected value of the inversion period is shorter than the predetermined value.

In this embodiment, the inversion period-correcting means sets the value of the inversion period to a larger value as the value of the at least one operating parameter detected by the operating parameter-detecting means shows a value indicative of a larger value of the flow rate of the exhaust gases.

Preferably, the operating parameter-detecting means comprises intake air amount-detecting means for detecting an amount of intake air drawn into the engine.

More preferably, the intake air amount-detecting means detects parameters representative of rotational speed of the engine and load on the engine.

Alternatively, the intake air amount-detecting means may directly detect the amount of intake air drawn into the engine.

Further preferably, the intake air amount-detecting means includes averaging means for averaging the amount of the intake air detected by the intake air amount-detecting means.

The above and other objects, features, and advantages of the invention will be more apparent from the following detailed description taken in conjunction with the accompanying drawings.

BRIEF DESCRIPTION OF THE DRAWINGS

FIGS. 17A to 17E are timing charts showing, by way of example, the relationship between changes in the correction coefficient KO2 and the inversion time periods TL, TR according to the second embodiment.

DETAILED DESCRIPTION

The invention will now be described in detail with reference to the drawings showing embodiments thereof.

Figure 1:
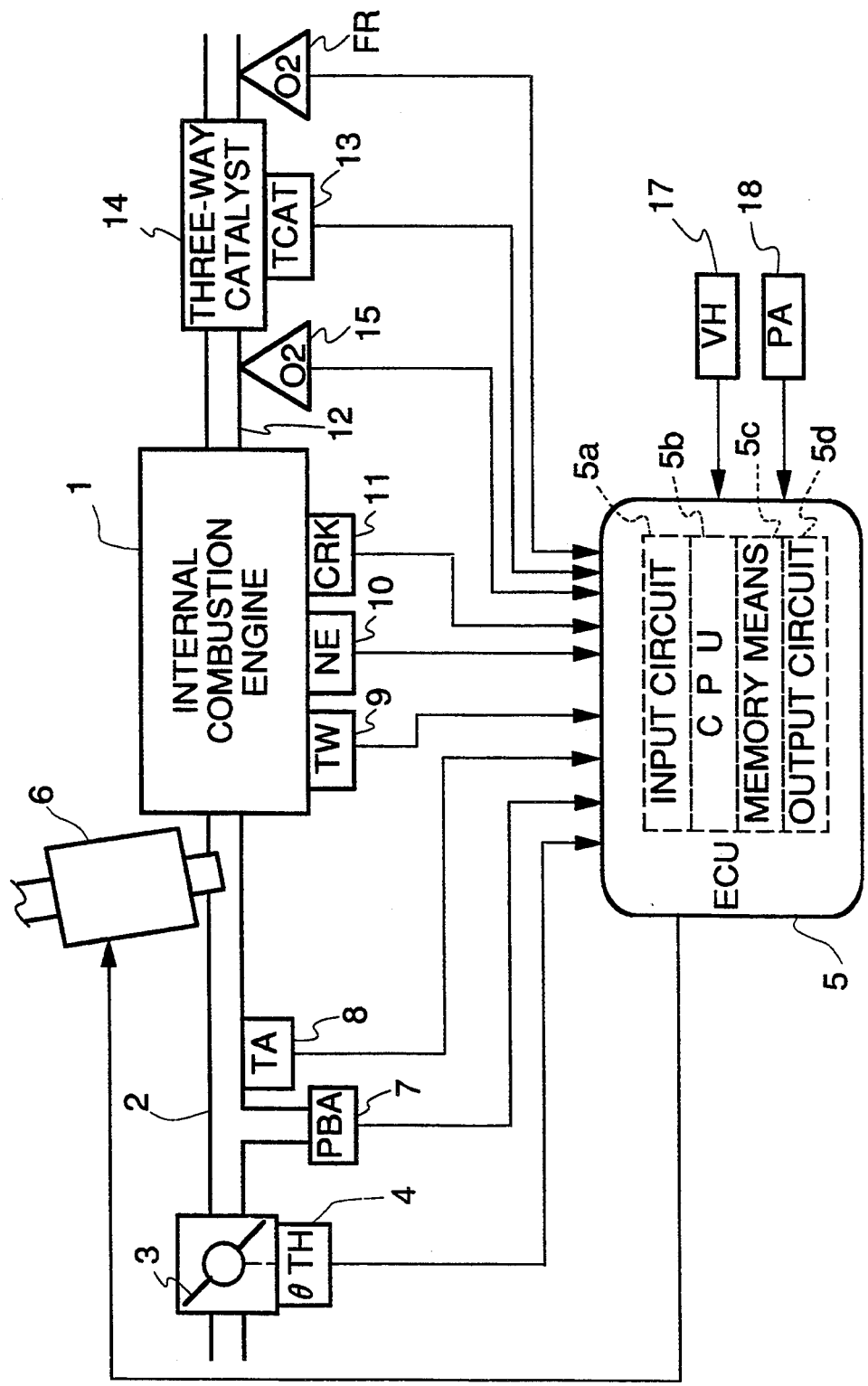
FIG. 1 is a block diagram showing the whole arrangement of an internal combustion engine and a control system therefor, which incorporates a catalyst deterioration-detecting system according to a first embodiment of the invention.

Referring first to FIG. 1, there is shown the whole arrangement of an internal combustion engine and a control system therefor, which incorporates a catalyst deterioration-determining system according to a first embodiment of the invention. In the figure, reference numeral 1 designates an internal combustion engine for automotive vehicles. Connected to the cylinder block of the engine 1 is an intake pipe 2 in which is arranged a throttle valve 3. A throttle valve opening ($\theta$TH) sensor 4 is connected to the throttle valve 3 for generating an electric signal indicative of the sensed throttle valve opening and supplying same to an electronic control unit (hereinafter referred to as "the ECU") 5.

Fuel injection valves 6, only one of which is shown, are inserted into the interior of the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 7 is provided in communication with the interior of the intake pipe 2 at a location immediately downstream of the throttle valve 3 for supplying an electric signal indicative of the sensed absolute pressure within the intake pipe 2 to the ECU 5. An intake air temperature (TA) sensor 8 is inserted into the intake pipe 2 at a location downstream of the intake pipe absolute pressure sensor 7 for supplying an electric signal indicative of the sensed intake air temperature TA to the ECU 5.

An engine coolant temperature (TW) sensor 9, which may be formed of a thermistor or the like, is mounted in the cylinder block of the engine 1, for supplying an electric signal indicative of the sensed engine coolant temperature TW to the ECU 5. An engine rotational speed (NE) sensor 10 and a CRK sensor 11 are arranged in facing relation to a camshaft or a crankshaft of the engine 1, neither of which is shown. The engine rotational speed sensor 10 generates a pulse as a TDC signal pulse at each of predetermined crank angles whenever the crankshaft rotates through 180 degrees, for supplying same to the ECU 5. The CRK sensor 11 generates a pulse as a CRK signal pulse at each of predetermined crank angles whenever the crankshaft rotates through 45 degrees, for supply same to the ECU 5.

A three-way catalyst (hereinafter referred to as "the catalyst") 14 is arranged within an exhaust pipe 12 connected to the cylinder block of the engine 1 for purifying noxious components such as HC, CO, and NOx. O2 sensors 15, 16 as oxygen concentration sensors are mounted in the exhaust pipe 12 at locations upstream and downstream of the three-way catalyst 14, respectively, for sensing the concentration of oxygen present in exhaust gases emitted from the engine 1 and supplying respective electric signals FVO2, RVO2 indicative of the sensed concentration values thereof to the ECU 5. Further, a catalyst temperature (TCAT) sensor 13 is mounted on the three-way catalyst 14 for detecting the temperature of same and supplying a signal indicative of the detected catalyst temperature TCAT to the ECU 5.

A vehicle speed (VH) sensor 17 and an atmospheric pressure (PA) sensor 18 are electrically connected to the ECU 5 for detecting the vehicle speed VH and the atmospheric pressure PA, respectively, and supplying respective signals indicative of the detected vehicle speed VH and atmospheric pressure PA to the ECU 5.

The ECU 5 comprises an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter called "the CPU") 5b, a memory means 5c storing various operational programs which are executed in the CPU 5b, and for storing results of calculations therefrom, etc., and an output circuit 5d which outputs driving signals to the fuel injection valves 6.

The CPU 5b operates in response to the above-mentioned signals from the sensors to determine various operating conditions in which the engine 1 is operating, such as an air-fuel ratio feedback control region in which the air-fuel ratio is controlled in response to the detected oxygen concentration in the exhaust gases, and open-loop control regions other than the air-fuel ratio feedback control region, and calculates, based upon the determined operating conditions, the valve opening period or fuel injection period TOUT over which the fuel injection valves 6 are to be opened, by the use of the following equation (1) in synchronism with inputting of TDC signal pulses to the ECU 5:

$$TOUT = Ti \times KO2 \times KLS \times K1 + K2 \qquad (1)$$

where Ti represents a basic value of the fuel injection period TOUT of the fuel injection valves 6, which is determined in accordance with the engine rotational speed NE and the intake pipe absolute pressure PBA.

KO2 represents an air-fuel ratio feedback control correction coefficient whose value is determined in response to the oxygen concentration in the exhaust gases during air-fuel ratio feedback control, while it is set to respective predetermined appropriate values while the engine is in the open-loop control regions.

KLS represents an air-fuel ratio leaning coefficient, which is set to a predetermined value less than 1.0 (e.g. 0.95) when the engine is in certain open-loop control regions, such as a predetermined engine deceleration region including an air-fuel ratio leaning region and a fuel cut region.

K1 and K2 represent other correction coefficients and correction variables, respectively, which are calculated based on various engine operating parameter signals to such values as to optimize characteristics of the engine such as fuel consumption and driveability depending on operating conditions of the engine.

The CPU 5b supplies through the output circuit 5d, the fuel injection valves 6 with driving signals corresponding to the calculated fuel injection period TOUT determined as above, over which the fuel injection valves 6 are opened.

Next, a manner of detecting deterioration of the catalyst 14 will now be described.

Determination of deterioration of the catalyst 14 is carried out during execution of air-fuel feedback control which is based upon an output RVO2 from the downstream O2 sensor 16 alone. The CPU 5b generates a special P term PLSP for skipping the value of the air-fuel ratio correction coefficient KO2 from a richer side to a leaner side with respect to a stoichiometric air-fuel ratio when the O2 sensor output RVO2 is inverted from a leaner side to a richer side with respect to a predetermined reference voltage RVREF, and then measures a time period TL elapsed from the time of generation of the special P term PLSP to the time the O2 sensor output RVO2 is inverted from the richer side to the leaner side. Similarly, the CPU 5b generates a special P term PRSP for skipping the value of the air-fuel ratio correction coefficient KO2 from the leaner side to the richer side with respect to the stoichiometric air-fuel ratio when the O2 sensor output RVO2 is inverted from the richer side to the leaner side with respect to the predetermined reference voltage RVREF, and then measures a time period TR elapsed from the time of generation of the special P term PRSP to the time O2 sensor output RVO2 is inverted from the leaner side to the richer side. Based upon the inversion time periods TL, TR thus measured, it is determined whether or not the catalyst 14 is deteriorated.

Figure 2:
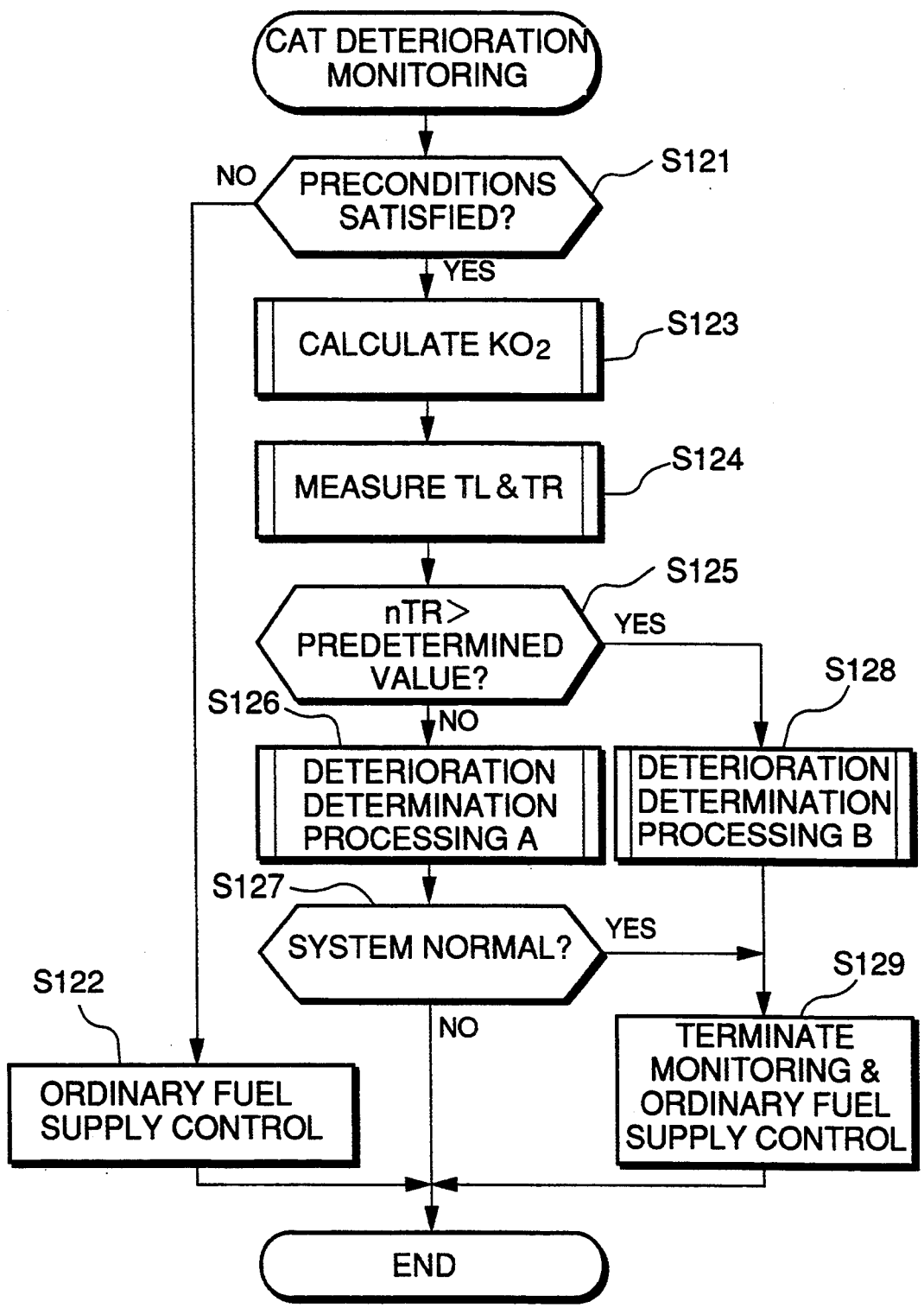
FIG. 2 is a flowchart of a main program for detecting deterioration of a catalyst appearing in FIG. 1.

The outline of the manner of detecting deterioration of the catalyst 14 will now be explained with reference to FIG. 2 showing a main program for carrying out the deterioration detection. This program is executed at regular time intervals (e.g. 5 msec).

First, at a step S121, it is determined whether or not preconditions for carrying out the deterioration detection are satisfied.

More specifically, whether or not catalyst deterioration monitoring is permitted. The catalyst deterioration monitoring is inhibited while other kinds of monitoring are executed, such as O2 sensor deterioration monitoring, monitoring as to failure of an evaporative emission control system, not shown, and monitoring as to abnormality in the fuel supply system of the engine, and also while diagnoses as to faults of various sensors are executed.

Then, whether or not the engine 1 is in a predetermined operating condition is determined. Specifically, determinations are made as to whether or not the intake air temperature TA detected by the intake air temperature sensor 8 lies within a predetermined range of 60° C. to 100° C., whether or not the coolant temperature TW detected by the coolant temperature sensor 9 lies within a predetermined range of 60° C. to 100° C., whether or not the engine rotational speed NE detected by the engine rotational speed sensor 10 lies within a predetermined range of 2800 rpm to 3200 rpm, whether or not the intake pipe absolute pressure PBA detected by the intake pipe absolute pressure sensor 7 lies within a predetermined range of −350 mmHg to −250 mmHg, whether or not the vehicle speed VH detected by the vehicle speed sensor 11 lies within a predetermined range of 32 km/h to 80 km/h, and whether or not the catalyst temperature TCAT detected by the catalyst temperature sensor 13 lies within a predetermined range of 400° C. to 800° C.

Then, it is determined whether or not the vehicle is cruising, i.e. whether or not the variation in the vehicle speed VH has continually been below 0.8 km/sec. over a predetermined time period (e.g. 2 seconds), whether or not air-fuel ratio feedback control was effected over a predetermined time period (e.g. 10 seconds) before the permission of the monitoring, and whether or not a predetermined time period (e.g. 2 seconds) has elapsed after all the answers to the above questions became affirmative.

When all the above conditions are satisfied, it is judged at the step S121 that the catalyst monitoring is permissible, whereas if any of the conditions is not satisfied, it is judged that the catalyst monitoring is not permitted.

If the answer to the question of the step S121 is negative (NO), that is, if the monitoring preconditions are not satisfied, the catalyst deterioration monitoring is not carried out but normal fuel supply control is carried out at a step S122, followed by terminating the program. If any of the conditions becomes dissatisfied during the catalyst deterioration monitoring, the initial value of the correction coefficient KO2 is set to an average value KREF of the correction coefficient KO2. On the other hand, if the answer to the question of the step S121 is affirmative (YES), that is, if the monitoring preconditions are satisfied, the program proceeds to a step S123, wherein the value of the correction coefficient KO2 is calculated in response to the output RVO2 from the downstream O2 sensor 16, and then at a step S124 the inversion time periods TL, TR are calculated.

Then, it is determined at a step S125 whether or not a value nTR which is a number of times of measurement of the inversion time period TR exceeds a predetermined value. If the former does not exceeds the latter, a deterioration determining processing A is carried out at a step S126. The deterioration determining processing A is for determining whether or not a predetermined time period (e.g. 2.5 sec.) has elapsed from the time the output RVO2 from the downstream O2 sensor 16 was inverted across the predetermined reference voltage RVREF, while no further inversion has occurred in the output RVO2. If the inversion time interval from one inversion to the next inversion is longer than the predetermined time period, it is judged that the oxygen storage capacity of the catalyst 14 is sufficient, and then it is determined that the catalyst 14 is qualified, without effecting a deterioration determining processing B, hereinafter described.

Then, it is determined at a step S127 whether or not normality of the exhaust gas purifying system has been determinatively determined, i.e. whether or not the catalyst 14 has been determined to be qualified, by the deterioration determining processing A. If the answer is negative (NO), the program is immediately terminated, whereas if the answer is affirmative (YES), the program proceeds to a step S129.

If the answer to the question of the step S125 is affirmative (YES), i.e. if the TR measurement time number nTR has reached the predetermined value, the deterioration determining processing B is carried out at a step S128, and then the program proceeds to the step S129 to carry out the normal fuel supply control after completion of the catalyst deterioration monitoring, followed by terminating the program. Incidentally, also at the step S129, the initial value of the correction coefficient KO2 is set to the average value KREF.

Figure 3:
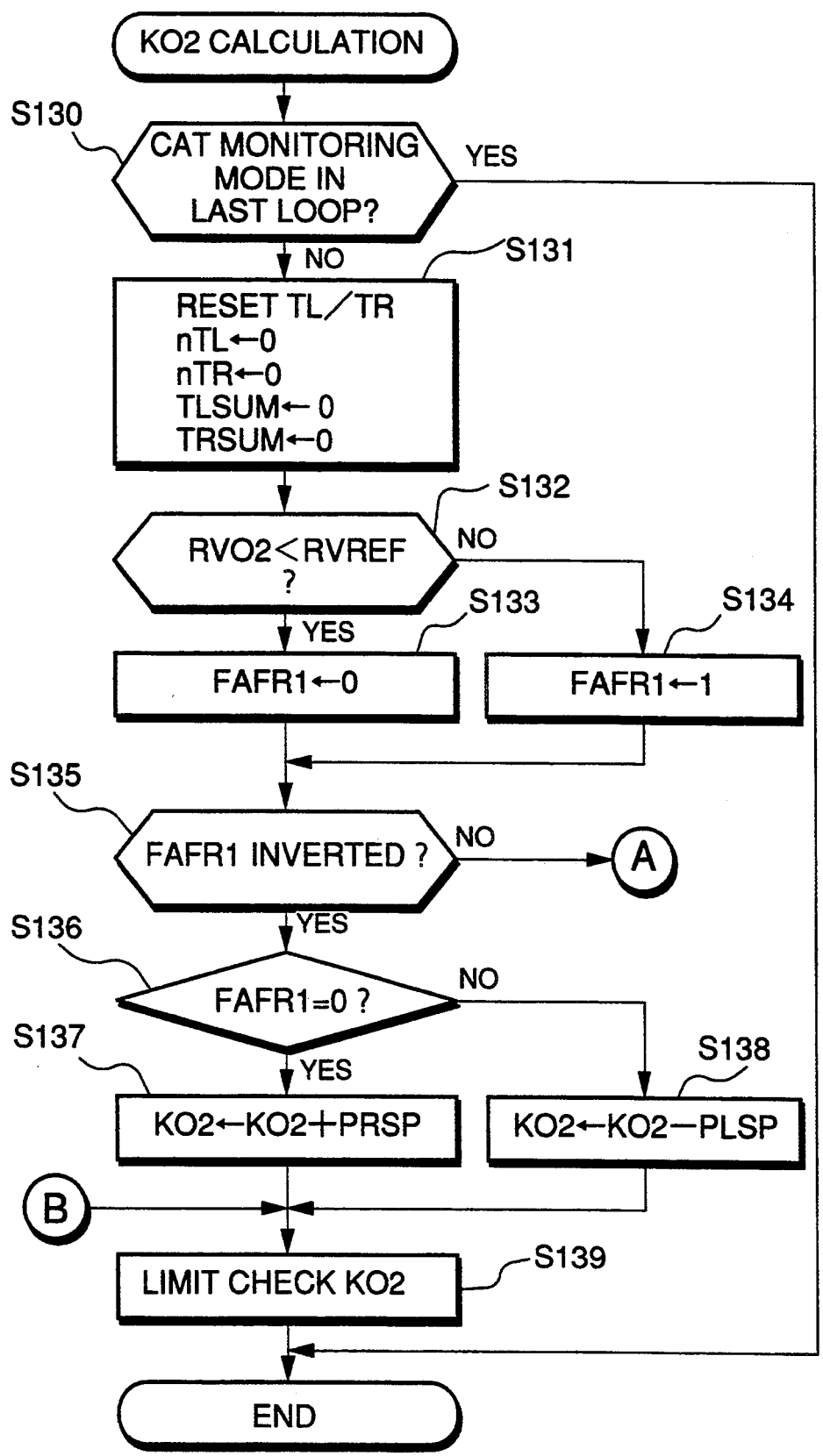
FIG. 3 is a flowchart showing a subroutine of calculation of an air-fuel ratio correction coefficient KO2 executed at a step in FIG. 2.
Figure 4:
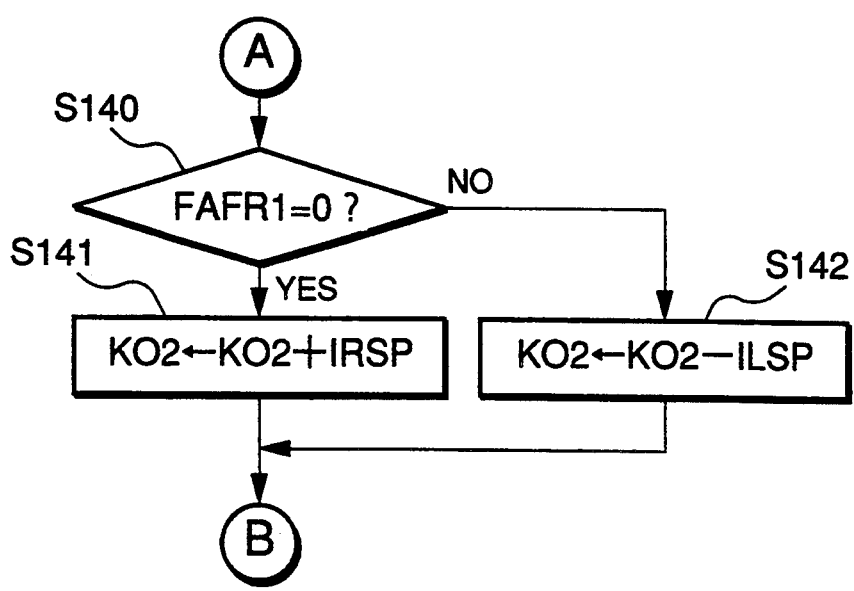
FIG. 4 is a flowchart showing a continued part of the program of FIG. 3.

FIGS. 3 and 4 show a program for carrying out calculation of the air-fuel ratio feedback correction coefficient KO2, which is executed at the step S123 in FIG. 2.

First, at a step 130, it is determined whether or not the operation was in the catalyst monitoring mode in the last loop. If the answer is affirmative (YES), i.e. if the present loop is the second loop or a subsequent loop after the operation entered the catalyst monitoring mode, the program is immediately terminated, whereas if the answer is negative (NO), i.e. if the present loop is the first loop where the operation enters the catalyst monitoring mode, the inversion time periods TL, TR are reset, and at the same time a value nTL which is a total number of times of measurement of the inversion time period TL, nTR (the total number of times of measurement of TR), TLSUM (the sum of TL values obtained by a plurality of times of measurements of TL), and TRSUM (the sum of TR values obtained by a plurality of times of measurements of TR) are all set to 0, at a step S131.

Then, it is determined at a step S132 whether or not the output RVO2 from the downstream O2 sensor 16 is smaller than the predetermined reference value RVREF. If RVO2<RVREF holds, a flag FAFR1 is set to "0" at a step S133, whereas if RVO2≧RVREF holds, the flag FAFR1 is set to "1" at a step S134, and then the program proceeds to a step S135. The flag FAFR1 indicates states of the air-fuel ratio dependent upon the downstream O2 sensor output RVO2, such that when the air-fuel ratio is lean, it is set to "0", and when the air-fuel ratio is rich, it is set to "1".

At the step S135, it is determined whether the flag FAFR1 has been inverted from "1" to "0" or vice versa. If the answer is affirmative (YES), i.e. if the the air-fuel ratio indicated by the downstream O2 sensor output RVO2 has been inverted from a rich state to a lean state or vice versa, it is determined at a step S136 whether or not the flag FAFR1 assumes "0".

If the flag FAFR1 assumes "0", that is, if the air-fuel ratio after the inversion is lean, proportional term control is executed wherein the special P term PRSP is added to an immediately preceding value of the correction coefficient KO2, at a step S137. Thus, when the downstream O2 sensor output RVO2 has been inverted to the lean side across the reference value RVREF, the air-fuel ratio of the mixture supplied to the engine is stepwise changed in the enriching direction.

On the other hand, if it is determined at the step S136 that the air-fuel ratio after the inversion is rich, proportional term control is carried out wherein the special P term PLSP is subtracted from the immediately preceding value of the correction coefficient KO2, at a step S138. Thus, when the downstream O2 sensor output RVO2 has been inverted to the rich side across the reference value RVREF, the air-fuel ratio of the mixture supplied to the engine is stepwise changed in the leaning direction.

If it is determined at the step S135 that the air-fuel ratio indicated by the downstream O2 sensor output RVO2 has not been inverted, it is determined at a step S140 whether or not the flag FAFR1 assumes "0". If it assumes "0", that is, if the air-fuel ratio indicated by the output RVO2 is lean, integral term control is carried out wherein a special I term IRSP is added to the immediately preceding value of the correction coefficient KO2, at a step S141. Thus, the air-fuel ratio of the mixture supplied to the engine is gradually changed in the enriching direction.

On the other hand, if the answer to the question of the step S140 is negative (NO), i.e. if the air-fuel ratio indicated by the downstream O2 sensor output. RVO2 is rich, integral term control is carried out wherein a special I term ILSP is subtracted from the immediately preceding value of the correction coefficient KO2, at a step S142. Thus, the air-fuel ratio of the mixture supplied to the engine is gradually changed in the leaning direction.

After calculation of the correction coefficient KO2 at the step S137, S138, S141 or S142, the program proceeds to a step S139, wherein limit checking of the calculated value of the correction coefficient KO2 is effected by setting the correction coefficient KO2 value to a predetermined upper value or a predetermined lower value if the former lies outside a predetermined range defined by the predetermined upper and lower values, followed by terminating the program.

Figure 5:
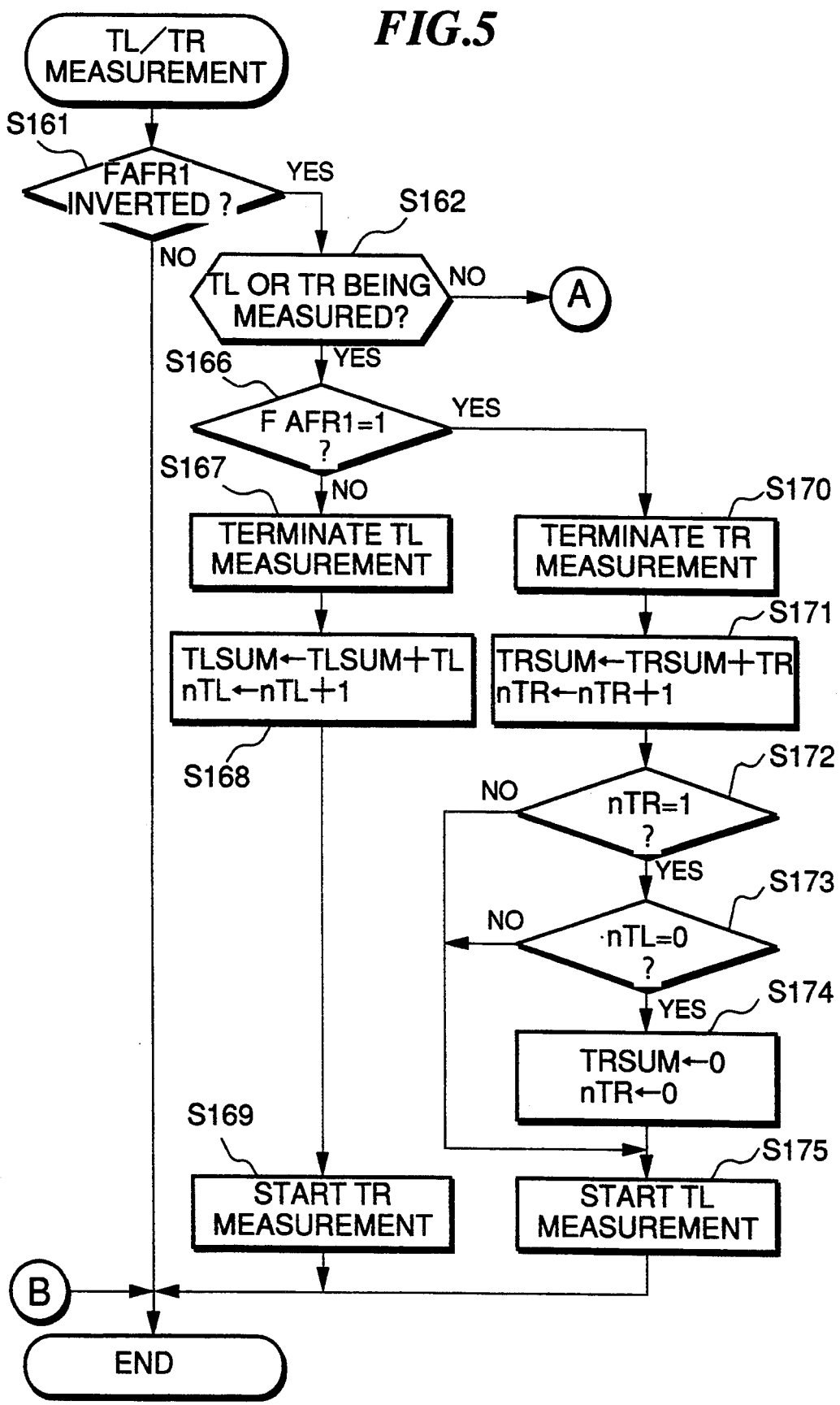
FIG. 5 is a flowchart showing a subroutine for measuring inversion time periods (inversion periods) TL and TR executed at a step in FIG. 2.
Figure 6:
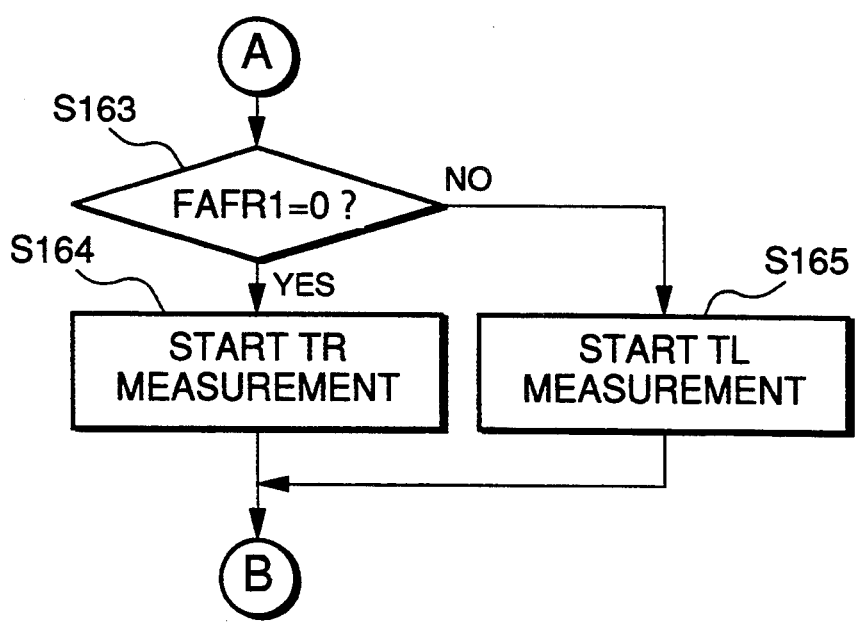
FIG. 6 is a flowchart showing a continued part of the program of FIG. 5.

FIGS. 5 and 6 show details of the TL/TR measurement processing executed at the step S124 in FIG. 2.

First, at a step S161, it is determined whether or not the flag FAFR1 has been inverted from "0" to "1" or vice versa. If the answer is negative (NO), that is, if there has been no inversion in the status of the air-fuel ratio indicated by the downstream O2 sensor output RVO2, the TL/TR measurement is not carried out, and the program is immediately terminated.

On the other hand, if the answer to the question of the step S161 is affirmative (YES), i.e. if there has been an inversion in the air-fuel ratio, it is determined at a step S162 whether or not measurement of TL or TR is being carried out. If neither of TL and TR is being measured, it is determined at a step S163 whether or not the flag FAFR1 assumes "1". If it does not assume "1", that is, if the air-fuel ratio after the inversion is lean, measurement of the inversion time period TR is started at a step S164, followed by terminating the program, whereas if the flag FAFR1 assumes "1", that is, if the air-fuel ratio after the inversion is rich, measurement of the inversion time period TL is started at a step S165, followed by terminating the program.

If the answer to the question of the step S162 is affirmative (YES), that is, if the air-fuel ratio has been inverted during measurement of the inversion time period TL or TR, it is determined at a step S166 whether the flag FAFR1 assumes "1". If it does not assume "1", that is, if the air-fuel ratio after the inversion is lean, the measurement of TL is terminated at a step S167. Then, the value of the inversion time period TL just calculated is added to an immediately preceding value of the TL sum TLSUM and the TL measurement time number nTL is incremented by 1 at a step S168. Then, measurement of the inversion time period TR is started at a step S169, followed by terminating the program.

On the other hand, if the answer to the question of the step S166 is affirmative (YES), that is, if the air-fuel ratio after the inversion is rich, the measurement of TR is terminated at a step S170. Then, the value of the inversion time period TR just calculated is added to an immediately preceding value of the TR sum TRSUM and the TR measurement time number nTR is incremented by 1 at a step S171.

Then, it is determined at a step S172 whether or not the TR measurement time number nTR is equal to 1. If nTR=1, it is determined at a step S173 whether or not the TL measurement time number nTL is equal to 0. If the answer is affirmative (YES), that is, if nTR=1 and at the same time nTL=0, the TR sum TRSUM and the TR measurement time number nTR are both set to 0 at a step S172, followed by terminating the program. This is because if the inversion time period TR is first measured before measurement of the inversion time period TL, the measured TR value is canceled in order to assure that measurement of the inversion time period TL precedes measurement of the invention time period TR. If the answer to the question of the step S172 or S173 is negative (NO), that is, if the measurement of TR in the present loop is not the first measurement, the measurement of TL is started at a step S175, followed by terminating the program.

Figure 7:
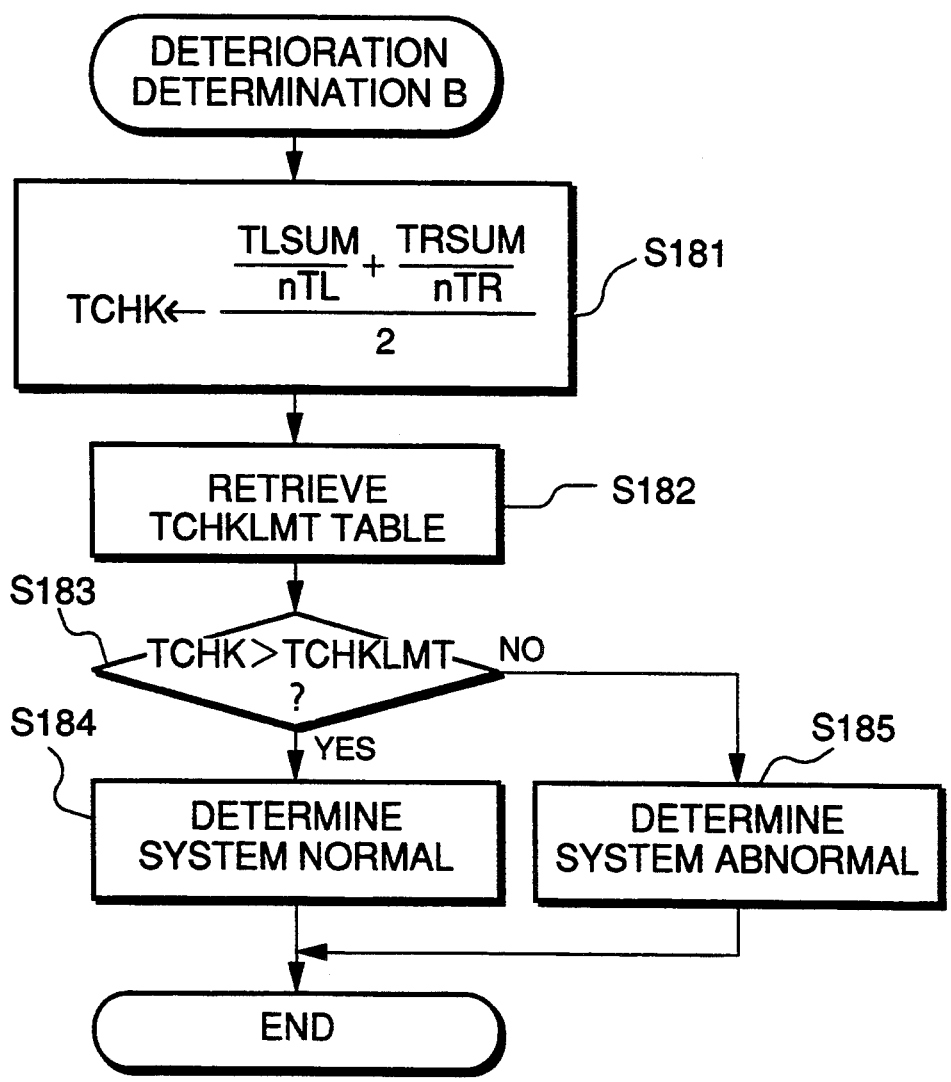
FIG. 7 is a flowchart showing a subroutine for executing a deterioration-determining processing B executed at a step in FIG. 2.

FIG. 7 shows details of the subroutine executed at the step S128 in FIG. 2 (deterioration-determining processing B). This subroutine is executed when the TR measurement time number nTR exceeds a predetermined value.

First, at a step S181 an average value of a value (TLSUM/nTL) obtained by dividing the TL value sum by the TL measurement time number nTL and a value (TRSUM/nTR) obtained by dividing the TR value sum by the TR measurement time number nTR is calculated to obtain a time period TCHK.

Figure 8:
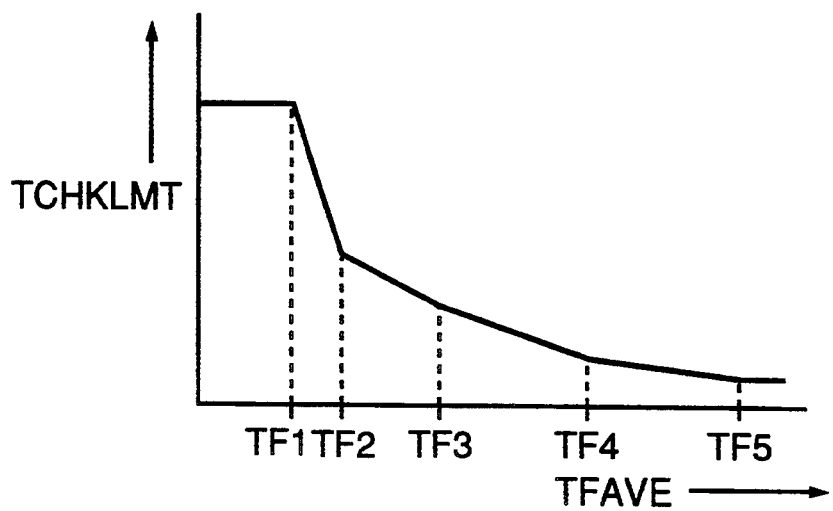
FIG. 8 shows a TCHKLMT table which is retrieved in execution of the program of FIG. 7.

Then, at a step S182, a TCHKLMT table is retrieved to determine a determination value TCHKLMT for comparison with the time period TCHK. The TCHKLMT table is shown in FIG. 8, wherein there are provided values of the determination value TCHKLMT corresponding, respectively, to predetermined values TF1-TF5 of an average value TFAVE of the intake air amount drawn into the engine 1. According to the table, as the average value TFAVE of the intake air amount is larger, the determination value TCHKLMT is set to a larger value.

Figure 9:
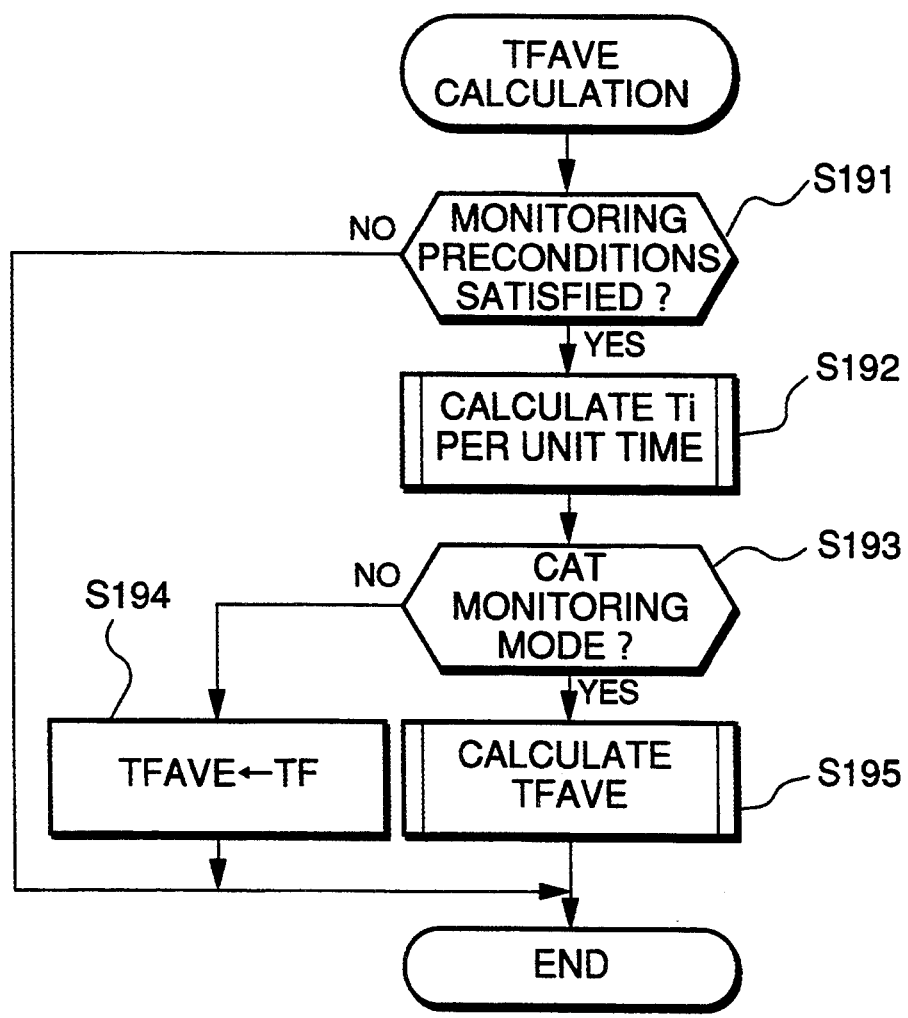
FIG. 9 is a flowchart showing a program for calculating an intake air amount per unit time.

The average value TFAVE of the intake air amount is calculated by a program shown in FIG. 9. This program is executed upon generation of each TDC signal pulse and in synchronism therewith.

First, at a step S191, it is determined whether or not the catalyst deterioration monitoring preconditions are satisfied. If the monitoring preconditions are not satisfied, the program is immediately terminated. If the monitoring preconditions are satisfied, the program proceeds to a step S192, wherein a value TF indicative of an amount of intake air per unit time is calculated, based on basic fuel injection amount Ti, by the use of the following equation (2):

$$TF = Ti \times NE \quad (2)$$

The basic fuel injection amount Ti is obtained as a function of the intake pipe absolute pressure PBA and the engine rotational speed Ne, similarly to the aforementioned equation (1). The value of Ti represents the intake air amount.

Then, at a step S193, it is determined whether or not the present operation is in the catalyst monitoring mode. If the present operation is not in the catalyst monitoring mode, the intake air amount value TF per unit time calculated in the present loop is set to an initial value of the average value TFAVE of the intake air amount, at a step S194, followed by terminating the program. On the other hand, if the present operation is in the catalyst monitoring mode, the average value TFAVE of the intake air amount is calculated by the use of the following equation (3) at a step S195, followed by terminating the program:

$$TFAVE = C \times TF + (1-C) \times TFAVE \quad (3)$$

where C represents a constant which has a predetermined value smaller than 1.0, and TFAVE on the right side an average value of the intake air amount calculated in the immediately preceding loop.

By thus calculating the average value of the intake air amount TF per unit time, the intake air amount can be accurately determined without being affected by noise.

After the retrieval of the TCHKLMT table at the steps S182 in FIG. 7, it is determined at a step S183 whether or not the time period TCHK exceeds the determination value TCHKLMT read at the step S182. If the answer is affirmative (YES), it is judged that the oxygen storage capacity of the catalyst 14 exceeds a required or reference value, determining at a step S184 that the exhaust gas purifying system is normally functioning, followed by terminating the program. On the other hand, if the answer to the question of the step S183 is negative (NO), it is determined at a step S185 that the exhaust gas purifying system is malfunctioning, followed by terminating the program.

Figure 10:
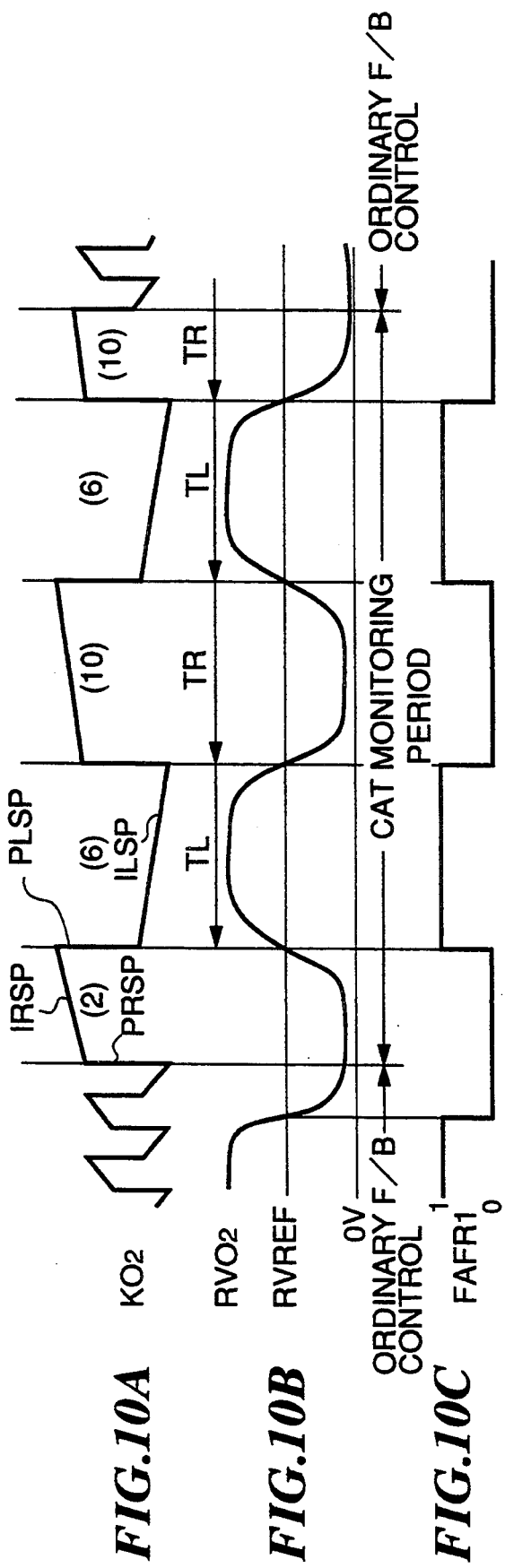
FIGS. 10A to 10C are timing charts showing, by way of example, the relationship between changes in the air-fuel ratio correction coefficient KO2 and inversion time periods TL, TR.

According to the first embodiment described above, as shown in FIGS. 10A–10C, simultaneously upon inversion of the downstream O2 sensor output RVO2, the special P term PLSP or PRSP is generated to cause skipping of the correction coefficient KO2, so that the air-fuel ratio of the mixture supplied to the engine 1 is changed from the richer side to the leaner side or vice versa. The inversion time period TL, TR elapsed from the time of an inversion in the output RVO2 to the time of the next inversion in the same corresponds to a time period elapsed from the time the special P term PLSP, PRSP is generated, that is, the time point the air-fuel ratio of the mixture supplied into the intake system is inverted to the time point the downstream O2 sensor output RVO2 is inverted. This time period indicates the oxygen storage capacity of the catalyst 14.

As described above, according to the first embodiment, the determination value TCHKLMT, which is compared with the inversion time periods TL, TR, is set to a value dependent upon the value TFAVE representative of the flow rate of exhaust gases in the exhaust system. That is, in view of the fact that the inversion time periods TL, TR become shorter as the intake air amount which has correlation to the flow rate of exhaust gases is larger, irrespective of whether the catalyst 14 is deteriorated, the determination value TCHKLMT is set to a smaller value as the exhaust gas flow rate is higher, as shown in FIG. 8. By comparing the inversion time periods TL, TR with the determination value TCHKLMT thus set, whether or not the catalyst 14 is deteriorated can be determined with accuracy, irrespective of the exhaust gas flow rate.

Further, according to the first embodiment, as mentioned above, by averaging the intake air amount TF per unit time to obtain the average value TFAVE as a value indicative of the exhaust gas flow rate, which is substantially free of the influence of noise, deterioration of the catalyst 14 can be more accurately determined.

Although in the first embodiment the special P terms TL, TR are generated at the same time the downstream O2 sensor output RVO2 is inverted, alternatively they may be generated after the lapse of a predetermined time period after the time the output RVO2 is inverted. In this alternative case, as the inversion time period TL, TR, it is desirable to measure a time period elapsed from the time the special P term PRSP or PLSP is generated to the time the output RVO2 is inverted.

Next, a second embodiment of the invention will be described with reference to FIG. 11 through FIG. 17. The following description refers only to features of the second embodiment which are different from the first embodiment described above.

Figure 11:
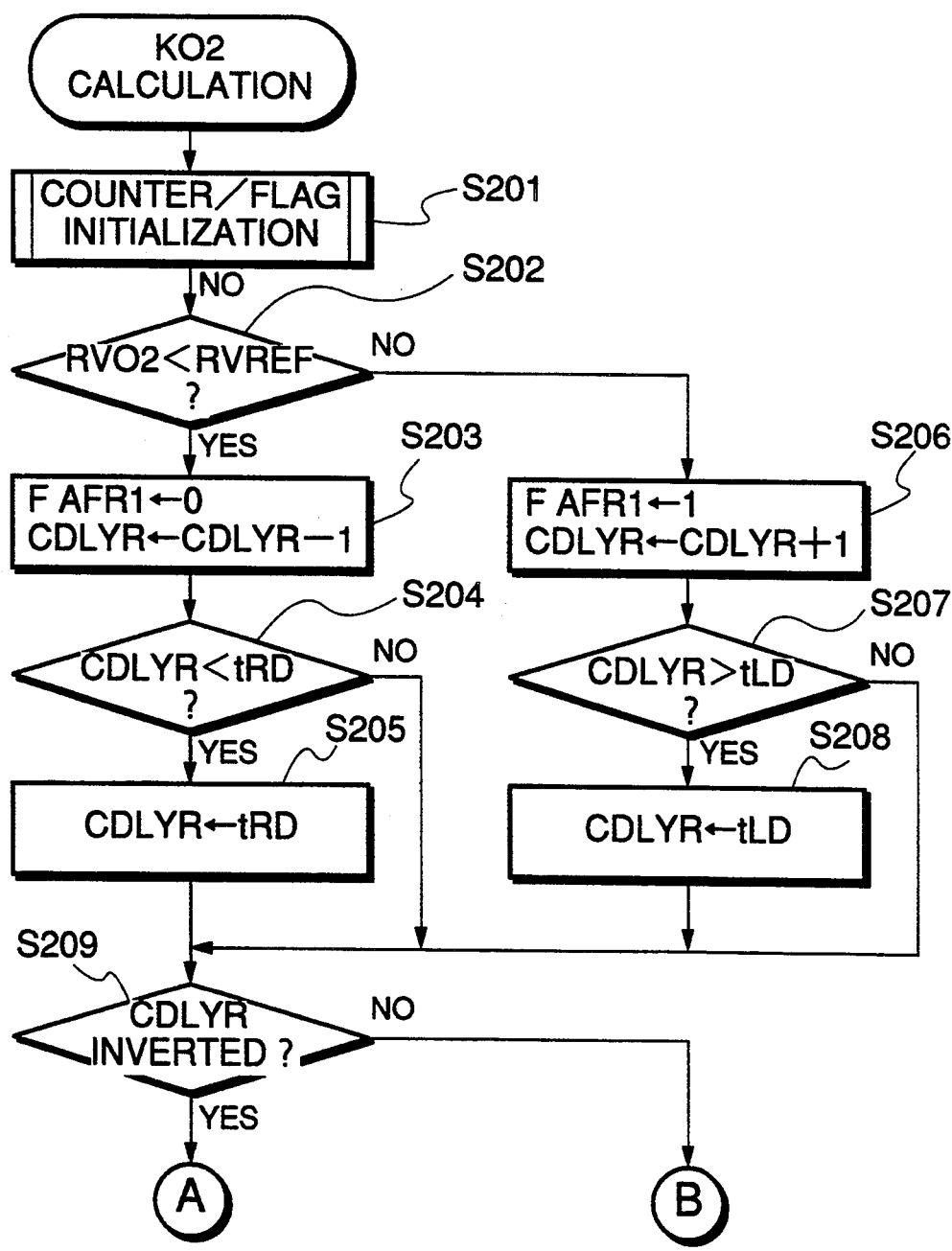
FIG. 11 is a flowchart showing a program for calculating the correction coefficient KO2 according to a second embodiment of the invention.
Figure 12:
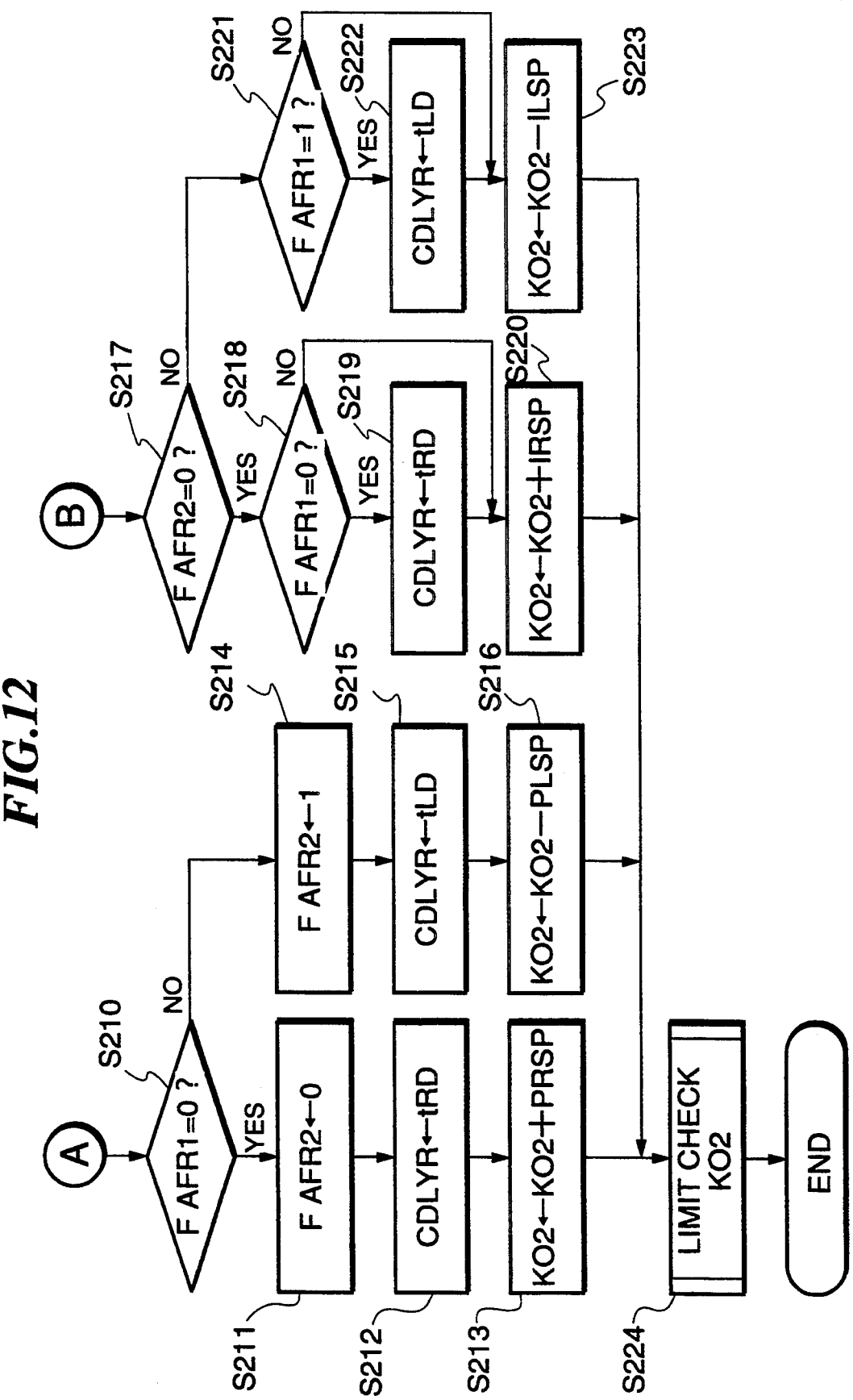
FIG. 12 is a flowchart showing a continued part of the program of FIG. 11.

FIGS. 11 and 12 show details of the subroutine for calculating the value of the correction coefficient KO2 executed at the step S123 in FIG. 2, according to the second embodiment.

First, a counter CDLYR and flags FAFR1, FAFR2 are initialized at a step S201, and then it is determined at a step S202 whether or not the downstream O2 sensor output RVO2 is smaller than the reference value RVREF. If the answer is affirmative (YES), that is, if the air-fuel ratio of the mixture supplied into the intake system is lean, the flag FAFR1 is set to "0", and a value of 1 is subtracted from a count value CDLYR of the counter CDLYR which is used to cause a delay in generation of the special P term, at a step S203. Then, it is determined at a step S204 whether or not the count value CDLYR indicates a time period shorter than a delay time period tRD (<0) for causing a delay in generation of the special P term PLSP (lean-skipping amount). If the answer is negative (NO), the program jumps to a step S209, whereas if the answer is affirmative (YES), the count value CDLYR is set to a value corresponding to the delay time period tRD (<0), at a step S205, and then the program proceeds to the step S209.

If the answer to the question of the step S202 is negative (NO), that is, if the air-fuel ratio of the mixture supplied into the intake system is rich, the flag FAFR1 is set to "1", and 1 is added to the count value CDLYR at a step S206. Then, it is determined at step S207 whether or not the count value CDLYR indicates a time period longer than a delay time period tLD (>0) for causing a delay in generation of the special P term PRSP. If the answer is negative (NO), the program jumps to the step S209, whereas if the answer is affirmative (YES), the count value CDLYR is set to a value corresponding to the delay time period tLD (>0), and then the program proceeds to the step S209.

At the step S209, it is determined whether or not the count value CDLYR has been inverted from a positive value to a negative value or vice versa. If it has been inverted, it is determined at a step S210 whether or not the flag FAFR1 assumes "0".

If the answer to the question of the step S210 is affirmative (YES), that is, if the air-fuel ratio of the mixture indicated by the output RVO2 after the inversion of the count value CDLYR is lean, the flag FAFR2 is set to "0" at a step S211, the count value CDLYR is set to a value corresponding to the delay time period tRD at a step S212, and proportional term control is effected wherein the special P term PRSP is added to an immediately preceding value of the correction coefficient KO2 at a step S213. The flag FAFR2 indicates states of the air-fuel ratio after the generation of the special P term is delayed, such that if the air-fuel ratio after the delay is lean, it is set to "0", whereas if the former is rich, the latter is set to "1".

If the answer to the question of the step S210 is negative (NO), that is, if the air-fuel ratio indicated by the output RVO2 after the inversion of the count value CDLYR is rich, the flag FAFR2 is set to "1" at a step S214, the count value CDLYR is set to a value corresponding to the delay time period tLD at a step S215, and proportional term control is effected wherein the special P term PLSP is subtracted from the immediately preceding value of the correction coefficient KO2 at a step S216.

If the answer to the question of the step S209 is negative (NO), that is, if there has been no inversion in the count value CDLYR, it is determined at a step S217 whether or not the flag FAFR2 assumes "0". If the flag FAFR2 assumes "0". it is determined at a step S218 whether or not the flag FAFR1 assumes "0". If the answer is negative (NO), that is, if the flag FAFR1 assumes "1" and at the same time the flag FAFR2 assumes "0", the program jumps to a step S220, wherein integral term control is effected to add the special I term IRSP to the immediately preceding value of the correction coefficient KO2. On the other hand, if the answer to the question of the step S218 is affirmative (YES), that is, if the flags FAFR1, FAFR2 both assume "0", the count value CDLYR is set to a value corresponding to the delay time period tRD at a step S219, and then the program proceeds to the step S220.

If the answer to the question of the step S217 is negative (NO), it is determined at a step S221 whether or not the flag FAFR1 assumes "1". If the answer is negative (NO), that is, if the flag FAFR1 assumes "0" and at the same time the flag FAFR2 assumes "1", the program jumps to a step S223, wherein integral term control is effected to subtract the special I term ILSP from the immediately preceding value of the correction value KO2. On the other hand, if the answer to the question of the step S221 is affirmative (YES), that is, if the flags FAFR1 FAFR2 both assume "1", the count value CDLYR is set to a value corresponding to the delay time period tLD at a step S222, and then the program proceeds to the step S223.

After the calculation of the correction coefficient KO2 has been made at the step S213, S216, S220 or S223, limit checking of the calculated value of the correction coefficient KO2 is carried out at a step S214, in a similar manner to that previously mentioned, followed by terminating the program.

Figure 13:
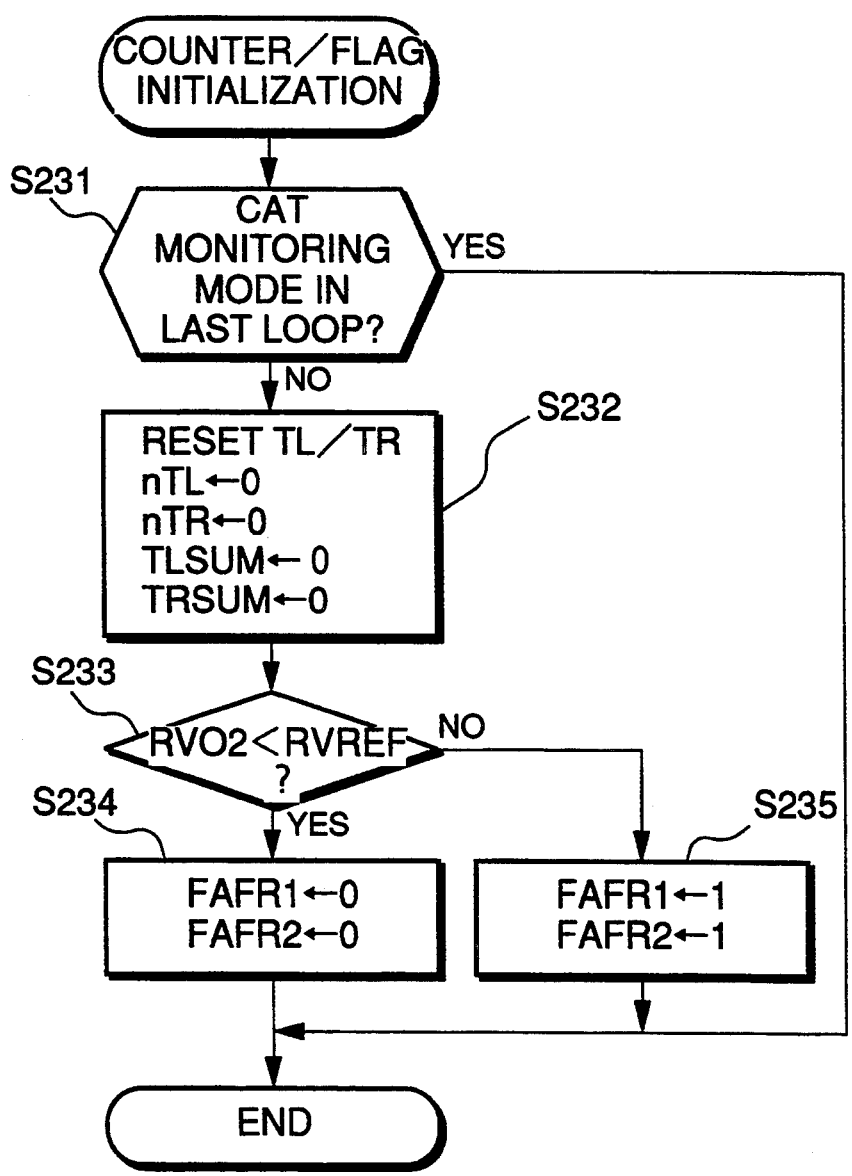
FIG. 13 is a flowchart showing a counter/flag initialization processing.

FIG. 13 shows details of the subroutine for carrying out the counter/flag initialization which is executed at the step S201 in FIG. 11. This program carries out a similar processing to the processing carried out by the steps S130 through S134 in FIG. 3 previously referred to in describing the first embodiment, except that the flags FAFR1 and FAFR2 are both set to "0" at a step S234 corresponding to the step S133 in FIG. 3 and the flags FAFR1, FAFR2 are both set to "1" at a step S235 corresponding to the step S134 in FIG. 3.

Figure 14:
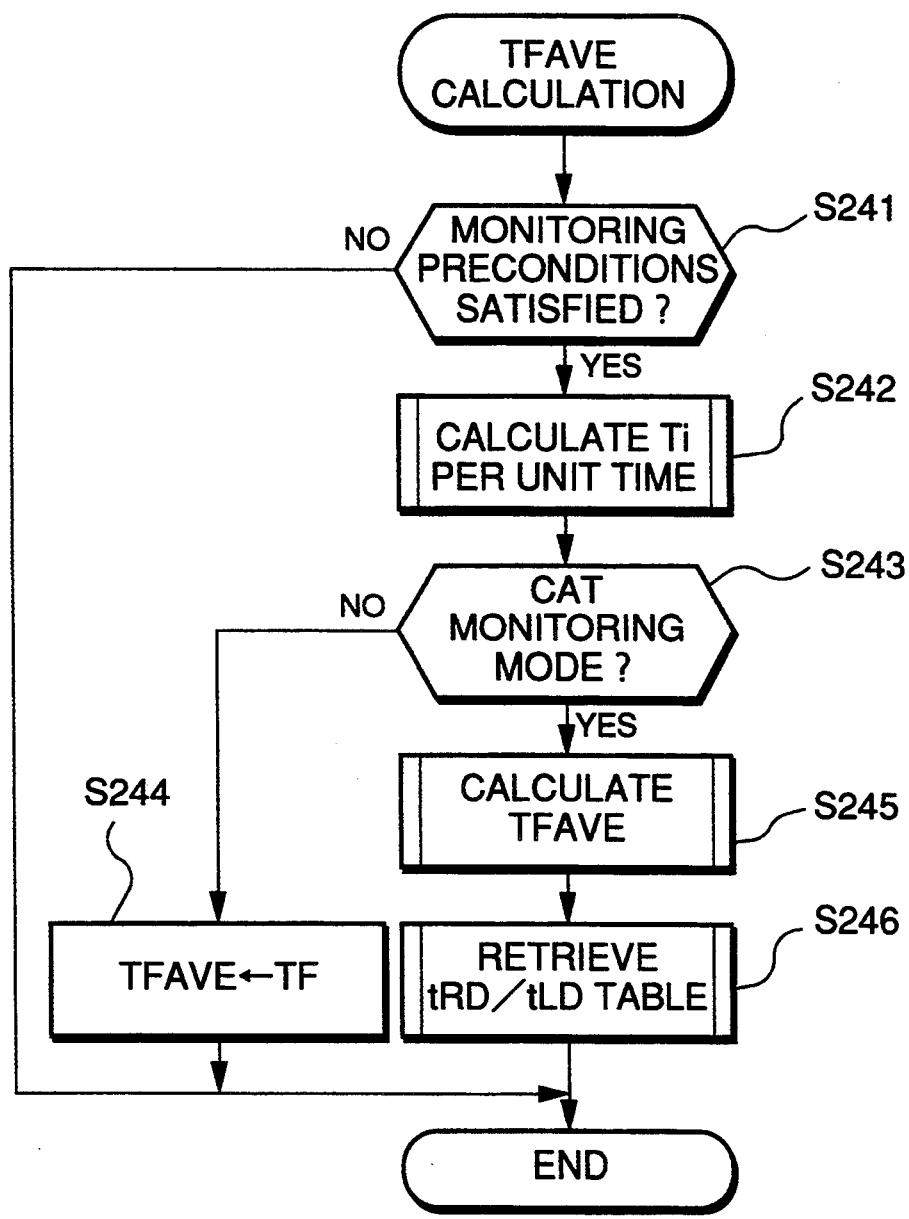
FIG. 14 is a flowchart showing a program for calculating an intake air amount per unit time according to the second embodiment.

FIG. 14 shows a program for calculating an intake air amount per unit time according to the second embodiment. The program is executed upon generation of each TDC signal pulse and in synchronism therewith.

In the flowchart of FIG. 14, steps S241–S245 correspond to and is substantially identical with the steps S191–S195 in FIG. 9 showing the first embodiment. The FIG. 14 program is distinguished from the FIG. 9 program only in that after calculation of the average value TFAVE of the intake air amount at the step S245 corresponding to the step S195 in FIG. 9, values of the delay time periods tRD, tLD are read from tables at a step S246.

Figure 15:
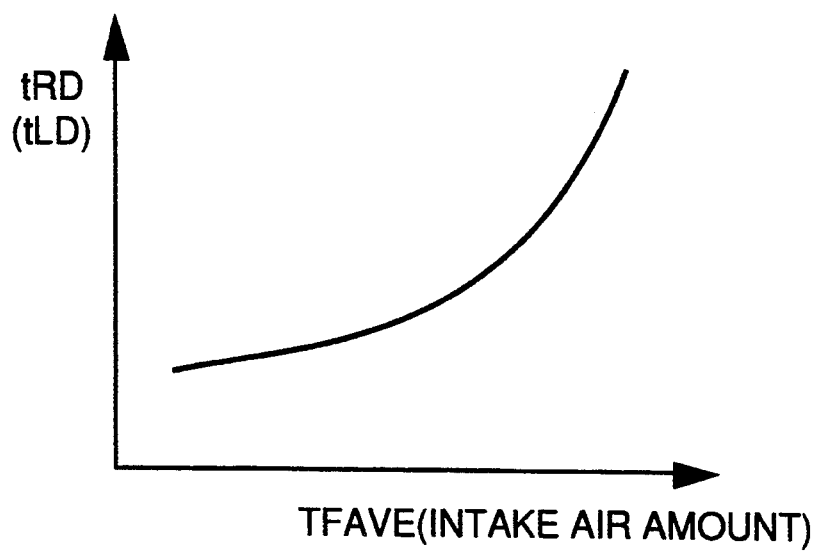
FIG. 15 shows a table which is retrieved in execution of the program of FIG. 14.

An example of the tRD and tLD tables is shown in FIG. 15, according to which the delay time period tRD, tLD is set to larger values as the average value TFAVE of the intake air amount is larger.

Although in the second embodiment the delay time periods tRD and tLD have the same curve with respect to the average value TFAVE, as shown in FIG. 15, the two delay time periods tRD, tLD may have different curves from each other, depending upon the output characteristic of the O2 sensor used.

Figure 16:
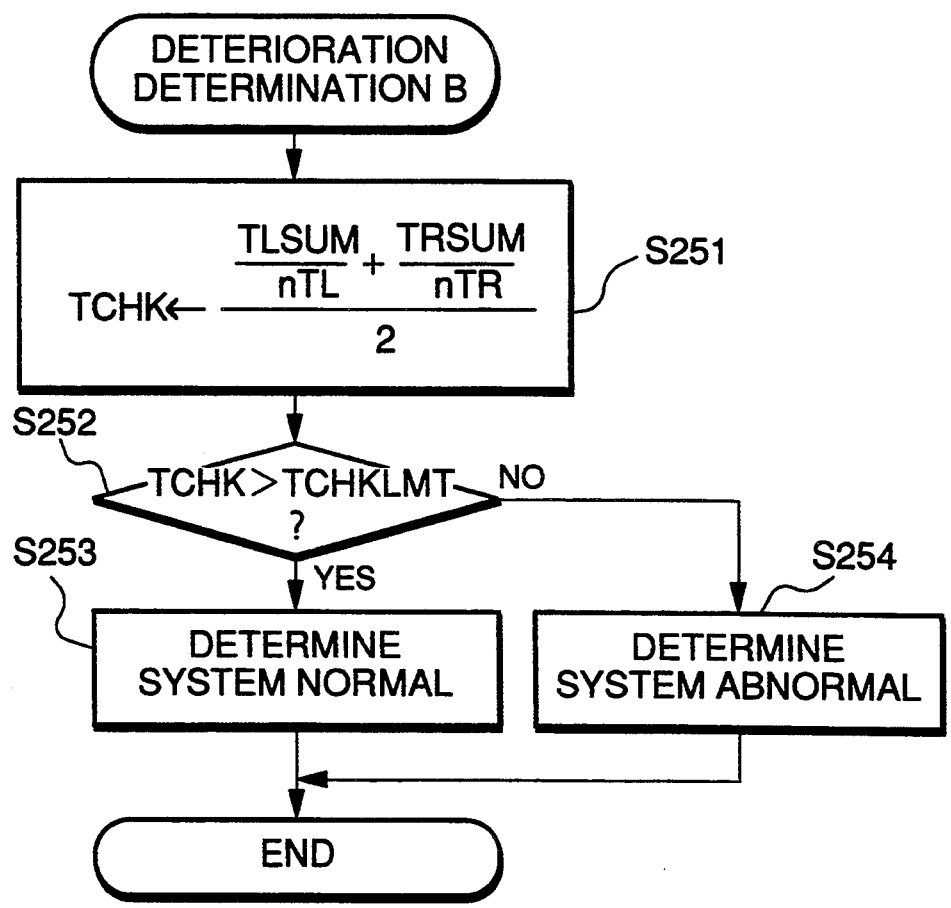
FIG. 16 is a flowchart showing a program for executing a deterioration-determining processing B according to the second embodiment.

FIG. 16 shows details of the subroutine for carrying out the catalyst deterioration-determining processing B which is executed at the step S128 in FIG. 2, according to the second embodiment. This program is identical with the program of FIG. 7 according to the first embodiment, except that a step corresponding to the step S182 in FIG. 7 for retrieving the TCHKLMT table is omitted and the determination value TCHKLMT which is compared with the time period TCHK at a step S252 corresponding to the step S183 in FIG. 7 is set to a fixed value (e.g. 0.98 sec).

According to the second embodiment, as shown in FIGS. 17A–17E, when the delay time period tRD has elapsed (at time point (5)) from the time point (3), (11) the downstream O2 sensor output RVO2 was inverted from the leaner side to the richer side with respect to the reference value RVREF, the special P term PLSP is generated to skip the correction coefficient KO2, so that the air-fuel ratio of the mixture supplied to the engine is changed from the richer side to the leaner side. Therefore, the inversion time period TL elapsed from the time point (3), (11) the O2 sensor output RVO2 is inverted from the leaner side to the richer side to the time point (7) the O2 sensor output RVO2 is inverted from the richer side to the leaner side the next time is longer by the delay time period tRD than the time period (6) elapsed from the time point (5) the special P term PLSP is generated, i.e. the time point the air-fuel ratio of the mixture supplied to the engine is changed from the richer side to the leaner side to the time point (7) the O2 sensor output RVO2 is inverted to the leaner side.

At the time point (9) the delay time period tLD has elapsed from the time point (7) the O2 sensor output RVO2 was inverted from the richer side to the leaner side with respect to the reference value RVREF, the special P term PRSP is generated to skip the correction coefficient KO2, so that the air-fuel ratio of the mixture supplied to the engine is changed from the leaner side to the richer side. Therefore, the inversion time period TR elapsed from the time point (7) the O2 sensor output RVO2 is inverted from the richer side to the leaner side to the time point (11) the O2 sensor output RVO2 is inverted from the leaner side to the richer side the next time is longer by the delay time period tLD than the time period 10) elapsed from the time point (9) the special P term PRSP is generated, i.e. the time point the air-fuel ratio of the mixture supplied to the engine is changed from the leaner side to the richer side to the time point (11) the O2 sensor output RVO2 is inverted to the richer side.

In contrast, according to the first embodiment described previously in which the delay time periods tRD, tLD are not provided, the time periods (6) and (11) coincide with the inversion time periods TL and TR, respectively.

In the second embodiment, the delay time periods tRD, tLD are set to values depending upon the flow rate of exhaust gases in the exhaust system. That is, as shown in FIG. 15, the delay time periods tRD, tLD are set to larger values as the intake air amount average value TFAVE representative of the exhaust gas flow rate increases. As a result, the inversion time periods TL, TR elapsed from the time of an inversion in the O2 sensor output RVO2 to the time of the next inversion in the same are adjusted to longer values as the exhaust gas flow rate increases.

Theoretically, the oxygen storage capacity of the catalyst 14 should be indicated by the inversion time periods (6), (10) elapsed from the air-fuel ratio of the mixture supplied to the engine is changed from the leaner side to the richer side and from the richer side to the leaner side due to generation of the special P terms PRSP, PLSP, respectively, to the time the O2 sensor output RVO2 is inverted. However, as mentioned before, the inversion time periods (6), (10) become shorter as the exhaust gas flow rate is larger. Therefore, according to the second embodiment, the inversion time periods TL, TR for comparison with the determination value TCHKLMT are adjusted by the delay time periods tRD, tLD, whereby deterioration of the catalyst 14 can be determined with accuracy irrespective of the exhaust gas flow rate, instead of varying the determination value TCHKLMT, i.e. by the use of the fixed determination value TCHKLMT.

The present invention is not limited to the above described embodiments, but various variations and modifications thereto are possible.

For example, while the determination value TCHKLMT in the first embodiment or the delay time periods tRD, tLD before generation of the special P terms in the second embodiment are varied depending upon the exhaust gas flow rate, alternatively the deterioration-determining time period TCHK may be corrected or varied depending upon the exhaust gas flow rate, providing equivalent results. In this alternative case, the determination value TCHKLMT may be a fixed value, like the second embodiment.

Further, although in the first and second embodiments the basic fuel injection period Ti is employed as a value representative of the exhaust gas flow rate, alternatively the intake air amount per se may be directly sensed by the use of an intake air flow rate sensor, and the sensed intake air amount or flow rate may be used to determine deterioration of the catalyst. Moreover, a flow rate sensor may be arranged in the exhaust system to directly sense the flow rate of exhaust gases flowing therein, to determine deterioration of the catalyst.

Although in the above described embodiments deterioration of the catalyst is determined based on the output from the O2 sensor arranged downstream of the catalyst, this is not limitative, but the invention may be applied to an arrangement or method that deterioration of a catalyst is determined based on an output from an oxygen concentration sensor arranged in the exhaust system of an internal combustion engine upstream of a catalyst in the exhaust system or based on both outputs from oxygen concentration sensors arranged in the exhaust system upstream and downstream of a catalyst therein.

What is claimed is:

1. A catalyst deterioration-detecting system for an internal combustion engine having an exhaust system, catalyst means arranged in said exhaust system, oxygen concentration-detecting means arranged in said exhaust system downstream of said catalyst means, for detecting concentration of oxygen in exhaust gases emitted from said engine, and air-fuel ratio control means responsive to an output from said oxygen concentration-detecting means, for controlling an air-fuel ratio of a mixture supplied to said engine, comprising:

catalyst deterioration parameter-detecting means for detecting a value of a catalyst deterioration parameter indicative of a degree of deterioration of said catalyst means;

operating parameter-detecting means for detecting a value of at least one operating parameter of said engine related to a flow rate of said exhaust gases in said exhaust system; and catalyst deterioration-determining means for determining whether said catalyst means is deteriorated, based on the value of said catalyst deterioration parameter detected by said catalyst deterioration parameter-detecting means and the value of said at least one operating parameter detected by said operating parameter-detecting means.

2. A catalyst deterioration-detecting system as claimed in claim 1, wherein said catalyst deterioration parameter-detecting means comprises inversion period-detecting means for detecting a value of an inversion period with which said output from said oxygen concentration-detecting means is inverted with respect to a predetermined reference value.

3. A catalyst deterioration-detecting system as claimed in claim 2, wherein said catalyst deterioration-determining means includes means for correcting the value of said inversion period in dependence on the value of said at least one operating parameter detected by said operating parameter-detecting means.

4. A catalyst deterioration-detecting system for an internal combustion engine having an exhaust system, catalyst means arranged in said exhaust system, oxygen concentration-detecting means arranged in said exhaust system downstream of said catalyst means, for detecting concentration of oxygen in exhaust gases emitted from said engine, and air-fuel ratio control means responsive to an output from said oxygen concentration-detecting means, for controlling an air-fuel ratio of a mixture supplied to said engine, comprising:

catalyst deterioration parameter-detecting means for detecting a value of a catalyst deterioration parameter indicative of a degree of deterioration of said catalyst means;

operating parameter-detecting means for detecting a value of at least one operating parameter of said engine related to a flow rate of said exhaust gases in said exhaust system;

determination value-setting means for setting a determination value for comparison with the value of said catalyst deterioration parameter detected by said catalyst deterioration parameter-detecting means, based on the value of said at least one operating parameter detected by said operating parameter-detecting means; and catalyst deterioration-determining means for comparing between the value of said catalyst deterioration parameter detected by said catalyst deterioration parameter-detecting means and said determination value set by said determination value-setting means, and for determining that said catalyst means is deteriorated, when the detected value of said catalyst deterioration parameter shows a value indicative of a larger degree of deterioration of said catalyst means than said determination value.

5. A catalyst deterioration-detecting system as claimed in claim 4, wherein said catalyst deterioration parameter-detecting means comprises inversion period-detecting means for detecting a value of an inversion period with which said output from said oxygen concentration-detecting means is inverted with respect to a predetermined reference value, said determination value-setting means setting said determination value for comparison with the value of said inversion period detected by said inversion period-detecting means, based on the value of said at least one operating parameter detected by said operating parameter-detecting means, said catalyst deterioration-determining means comparing between the value of said inversion period detected by said inversion period-detecting means and said determination value set by said determination value-setting means, and determining that said catalyst means is deteriorated, when the detected value of said inversion period is shorter than said determination value.

6. A catalyst deterioration-detecting system as claimed in claim 5, wherein said determination value-setting means sets said determination value to a smaller value as the value of said at least one operating parameter detected by said operating parameter-detecting means shows a value indicative of a larger value of said flow rate of said exhaust gases.

7. A catalyst deterioration-detecting system for an internal combustion engine having an exhaust system, catalyst means arranged in said exhaust system, oxygen concentration-detecting means arranged in said exhaust system downstream of said catalyst means, for detecting concentration of oxygen in exhaust gases emitted from said engine, and air-fuel ratio control means responsive to an output from said oxygen concentration-detecting means, for controlling an air-fuel ratio of a mixture supplied to said engine, comprising:

air-fuel ratio-determining means for comparing the output from said oxygen concentration-detecting means with a predetermined reference value to thereby determine whether the air-fuel ratio of said mixture supplied to said engine is on a richer side or a leaner side with respect to a stoichiometric air-fuel ratio;

air-fuel ratio-retarding control means for changing the air-fuel ratio of said mixture supplied to said engine across said stoichiometric air-fuel ratio upon the lapse of a delay time period after the time said inversion is detected by said inversion-detecting means;

catalyst deterioration parameter-detecting means for detecting a value of a catalyst deterioration parameter indicative of a degree of deterioration of said catalyst means;

operating parameter-detecting means for detecting a value of at least one operating parameter of said engine related to a flow rate of said exhaust gases in said exhaust system;

delay time period-determining means for determining a value of said delay time period, based on said value of said at least one operating parameter detected by said operating parameter-detecting means; and catalyst deterioration-determining means for comparing the value of said catalyst deterioration parameter detected by said catalyst deterioration parameter-detecting means with a predetermined value, and for determining that said catalyst means is deteriorated, when the value of said catalyst deterioration parameter detected by said catalyst deterioration parameter-detecting means shows a value indicative of a larger degree of deterioration of said catalyst means than said predetermined value.

8. A catalyst deterioration-detecting system as claimed in claim 7, wherein said delay time period-determining means sets the value of said delay time period to a larger value as the value of said at least one operating parameter detected by said operating parameter-detecting means shows a value indicative of a larger value of said flow rate of said exhaust gases.

9. A catalyst deterioration-detecting system as claimed in claim 8, wherein said catalyst deterioration parameter-detecting means comprises inversion period-detecting means for detecting a value of an inversion period with which said output from said oxygen concentration-detecting means is inverted with respect to a predetermined reference value, said catalyst deterioration-determining means comparing between the value of said inversion period detected by said inversion period-detecting means and said predetermined value, and determining that said catalyst means is deteriorated, when the detected value of said inversion period is shorter than said predetermined value.

10. A catalyst deterioration-detecting system for an internal combustion engine having an exhaust system, catalyst means arranged in said exhaust system, oxygen concentration-detecting means arranged in said exhaust system downstream of said catalyst means, for detecting concentration of oxygen in exhaust gases emitted from said engine, and air-fuel ratio control means responsive to an output from said oxygen concentration-detecting means, for controlling an air-fuel ratio of a mixture supplied to said engine, comprising:

catalyst deterioration parameter-detecting means for detecting a value of a catalyst deterioration parameter indicative of a degree of deterioration of said catalyst means;

operating parameter-detecting means for detecting a value of at least one operating parameter of said engine related to a flow rate of said exhaust gases in said exhaust system;

catalyst deterioration parameter-correcting means for correcting the value of said catalyst deterioration parameter detected by said catalyst deterioration parameter-detecting means, based on the value of said at least one operating parameter of said engine detected by said operating parameter-detecting means; and catalyst deterioration-determining means for comparing the value of said catalyst deterioration parameter corrected by said catalyst deterioration parameter-correcting means with a predetermined value, and for determining that said catalyst means is deteriorated, when the corrected value of said catalyst deterioration parameter shows a value indicative of a larger degree of deterioration of said catalyst means than said predetermined value.

11. A catalyst deterioration-detecting system as claimed in claim 10, wherein said catalyst deterioration parameter-detecting means comprises inversion period-detecting means for detecting a value of an inversion period with which said output from said oxygen concentration-detecting means is inverted with respect to a predetermined reference value, said catalyst deterioration parameter-correcting means correcting the value of said inversion period detected by said inversion period-detecting means, based on the value of said at least one operating parameter detected by said operating parameter-detecting means, said catalyst deterioration-determining means comparing between the value of said inversion period detected by said inversion period-detecting means and said predetermined value, and determining that said catalyst means is deteriorated, when the detected value of said inversion period is shorter than said predetermined value.

12. A catalyst deterioration-detecting system as claimed in claim 11, wherein said inversion period-correcting means sets the value of said inversion period to a larger value as the value of said at least one operating parameter detected by said operating parameter-detecting means shows a value indicative of a larger value of said flow rate of said exhaust gases.

13. A catalyst deterioration-detecting system as claimed in any of claims 1-12, wherein said operating parameter-detecting means comprises intake air amount-detecting means for detecting an amount of intake air drawn into said engine.

14. A catalyst deterioration-detecting system as claimed in claim 13, wherein said intake air amount-detecting means detects parameters representative of rotational speed of said engine and load on said engine.

15. A catalyst deterioration-detecting system as claimed in claim 13, wherein said intake air amount-detecting means directly detects said amount of intake air drawn into said engine.

16. A catalyst deterioration-detecting system as claimed in claim 13, wherein said intake air amount-detecting means includes averaging means for averaging said amount of said intake air detected by said intake air amount-detecting means.

* * * * *